Figure 1:
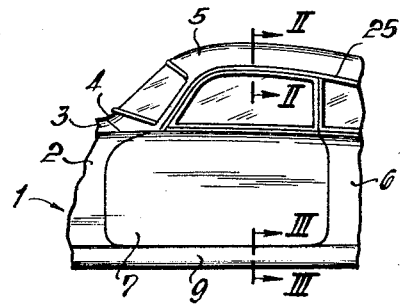

Dec. 11, 1962     E. KOMENDA     3,068,045

VEHICLE BODY DOOR CONSTRUCTION

Filed Oct. 24, 1960

INVENTOR
Erwin KOMENDA

BY Dicke, Craig + Freudenberg
ATTORNEYS

United States Patent Office 3,068,045
Patented Dec. 11, 1962

3,068,045
VEHICLE BODY DOOR CONSTRUCTION
Erwin Komenda, Stuttgart, Germany, assignor to Firma Dr. Ing. h.c. F. Porsche KG, Stuttgart-Zuffenhausen, Germany
Filed Oct. 24, 1960, Ser. No. 64,589
Claims priority, application Germany Nov. 13, 1959
3 Claims. (Cl. 296—44)

The present invention relates to a vehicle body for motor vehicles, provided with walls or wall panels composed of an outer and inner stamped or pressed sheet metal part or panel as well as with apertures for the doors, whereby the outer stamped part or panel is provided within the area of the aperture with an angularly bent flange forming the door gap.

In the known constructions of the type mentioned hereinabove which may be found in the prior art, the inner stamped part is secured directly at the flange. The connection between the stamped or pressed parts thereby takes place by spot welding. By reason of the relatively large width of the flange, the latter is likely to become warped during welding so that the securing flanges of the stamped parts can no longer abut against each other in a flat manner but extend instead in an undulated or waveshaped manner. As a result thereof, the penetration of humidity and dampness between the connections is rendered possible thereby. Since the parts in question are visible surfaces, the finishing work required in connection therewith is disadvantageous also insofar as appearance of these parts is concerned.

These disadvantages are avoided in accordance with the present invention by the fact that the flange is provided with a rim portion offset with respect to the plane of the flange, against which the inner stamped or pressed part is secured. The flange is thereby reinforced in an advantageous manner by the offset of the rim portion whereby there is achieved an essentially straight or rectilinear configuration of the pressed part within the area of the welded connection and therewith a completely satisfactory unobjectionable abutment thereof. The surface which has to be finished after welding is very small and is located at a distance from the outer surface of the wall part or wall panel.

It has proved itself advantageous if the rim portion of the flange of the outer pressed part is offset with respect to the door gap. The welding surface is thereby protected or shielded against direct visibility. With such an arrangement of the rim part at a door, the rim portion extends at a distance from the outer wall essentially over the entire circumference of the door.

In accordance with another feature of the present invention, it is proposed that the inner pressed or stamped wall part or panel be provided with a U-shaped profiled rim in which the door seal is accommodated and the free leg portion of which abuts against the offset rim portion of the flange.

By the use and construction of the connection of the pressed parts of the door in accordance with the present invention, there may result the further advantage depending on the arrangement of the rim portions that the offset rim portion simultaneously forms a water collecting channel. In the known prior art constructions, the water collecting channel is constituted in the lower part of the door by an essentially evenly extending flange of the outer stamped part and the angularly bent portion of the inner stamped part. The welded places are thereby disposed within the plane of the flange so that dampness and humidity can reach the same unimpededly. According to the present invention, the welded places are disposed at a distance from the plane of the flange so that they cannot be reached ordinarily by the water.

Accordingly, it is an object of the present invention to provide a vehicle body construction, and more particularly a connection between the inner and outer stamped wall panels of a vehicle body which obviates the disadvantages and shortcomings of the prior art constructions.

It is another object of the present invention to provide a connection, by means of welding, between the inner and outer body panels of a vehicle which minimizes the finishing work necessary after effecting these connections.

Still another object of the present invention resides in the provision of an arrangement for the inner and outer body panels of a vehicle in which the surfaces along which the same are connected abut at all times in an essentially flat manner.

A further object of the present invention resides in the provision of a connection for the inner and outer body panels of a motor vehicle in which warping of the connecting surfaces as a result of spot-welding assembly techniques is avoided or at least significantly reduced to thereby improve the appearance of the vehicle.

A still further object of the present invention resides in the provision of a welded joint between the inner and outer body panels constituting the walls of a motor vehicle which not only enhances the aesthetic appeal of the vehicle but also the life expectancy of the vehicle by protecting the joint against dampness and humidity.

Still another object of the present invention resides in the provision of a jointed connection, by means of welded joints, which not only reinforces the flange portion constituting, for example, the door gap but also simultaneously enables a simple construction for the channel collecting the rain water.

Figures 2, 3:
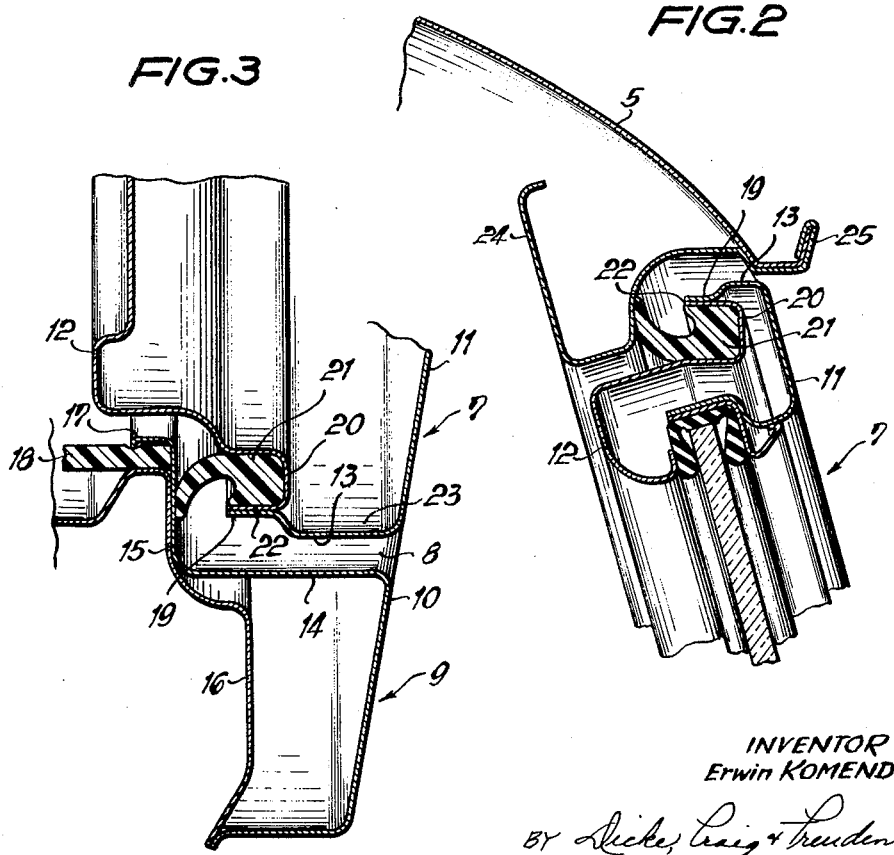

These and other objects, features and advantages of the present invention will become more obvious from the following description when taken in connection with the accompanying drawing which shows, for purposes of illustration only, one embodiment in accordance with the present invention, and wherein FIGURE 1 is a partial side elevational view of a motor vehicle consisting of pressed or stamped wall parts or panels in accordance with the present invention, FIGURE 2 is an enlarged cross-sectional view taken along line II—II of FIGURE 1, and FIGURE 3 is an enlarged cross-sectional view taken along line III—III of FIGURE 1.

Referring now to the drawing wherein like reference numerals are used throughout the various views thereof to designate corresponding parts, reference numeral 1 designates the vehicle body of the motor vehicle which is composed essentially of a wall part or panel 2 including the forward wheel casing as well as of the front hood 3 which is adjoined by the cowl 4 followed by a stamped or pressed roof part or panel 5. In the rear of the vehicle, there is arranged a side wall panel 6. Intermediate the two side wall panels 2 and 6, there is provided an aperture for the door 7 which is inserted therein while forming simultaneously a door gap 8 (FIGURE 3). The door aperture is bridged by a longitudinal bearer 9 (FIGURES 1 and 3) which is provided within this area with a stamped part 10 representing the door sill or threshold.

The door 7 is composed of an outer stamped part 11 and an inner stamped part 12 which are welded together. The door gap 8 is formed by an angularly bent portion of the outer stamped part 11. For that purpose, the outer stamped part 11 of the door includes an essentially horizontally extending flange 13 while the sill member 10 of the longitudinal bearer 9 also includes an angularly bent portion 14. The angularly bent portion 14 which extends essentially horizontally passes over into an essentially vertical web portion 15 which is secured at a longitudinal bearer 16. The web portion 15 terminates in a clamp 17 which serves for purposes of securing or holding the floor covering 18.

The longitudinal bearer 16 is completed into a box-shaped bearer member by a stamped or pressed part, which preferably forms the sheet metal floor of the vehicle and which is not illustrated herein.

The flange 13 of the outer stamped part 11 of the door 7 includes a rim portion 19 which is constructed offset into the door with respect to the door gap 8. As a result of this offset of a portion of the flange 13, the latter is effectively reinforced. The rim portion 19 extends over the entire circumference of the outer sheet metal member of panel 11 of the door and proceeds at a distance from the outer wall panel of the stamped part or parts of the vehicle.

The inner stamped or pressed part includes an essentially U-shaped rim portion 20 into which is inserted a sealing member 21. The seal 21 abuts against the web portion 15 with the door closed. The free leg portion 22 of the U-shaped part 20 thereby serves for purposes of securing the inner stamped part 12 to the rim portion 19.

A channel 23 is formed by the outer wall of the stamped part 11, the flange 13 and the offset rim portion 19 within the lower part of the door which channel serves for collecting or receiving water and moisture, for instance, moisture due to condensation. By raising the connection between the rim portions 19 and 22, no water or moisture can enter or reach between these two parts so that the premature destruction thereof by rust is effectively prevented.

The principal basic construction of the connection of the outer stamped part 11 with the inner stamped part 12 extends over the entire circumference of the door 7 so that, as may be readily seen in FIGURE 2, the flange 13 is secured also within the area of the stamped roof part 5 by means of a rim portion 19 at the flange 22 of the inner stamped part 12. The seal 21 thereby abuts against a correspondingly constructed roof girder 24 which is connected with the roof while simultaneously forming therewith a rain channel 25.

While I have shown and described one embodiment in accordance with the present invention, it is understood that the same is not limited thereto but is susceptible of many changes and modifications within the spirit and scope of the present invention. Thus, the basic invention may also be used, for example, to equally great advantage with stationary wall parts or panels of the motor vehicles instead of with the door as illustrated herein.

Thus, it is quite obvious that the present invention is not limited to the details shown and described herein but is susceptible in both its construction and application to many changes and modifications within the spirit and scope of the present invention, and I, therefore, do not wish to be limited to the details shown and described herein but intend to cover all such changes and modifications as are encompassed by the scope of the appended claims.

I claim:

1. A panel construction for a motor vehicle provided with body wall means, a door and a door-receiving aperture in said body wall means, said door comprising inner wall panel means and outer wall panel means, said outer wall panel means including an angularly bent portion thereof forming flange means, said flange means being provided with a rim portion and including a flange portion disposed in a substantially horizontal plane, said flange portion extending in directions inwardly of said vehicle and into the area of said aperture constituting the door gap when said door is in closed position, said rim portion including a part thereof offset upwardly from said plane of said flange portion and from said door gap, said inner wall panel means including an essentially U-shaped rim portion for accommodating thereon the door seal, said U-shaped rim portion comprising a free leg portion, said upwardly offset rim part comprising a portion abutting and secured to said free leg portion along a plane substantially parallel to said horizontal plane.

2. A panel construction according to claim 1 wherein said abutting portion is welded to said free leg portion, and wherein said offset rim part comprises a further portion angularly related to said abutting portion and to said flange portion.

3. A panel construction according to claim 1 wherein said first-named rim portion extends over the entire periphery of said door at a distance from and inwardly of said outer wall panel means.

References Cited in the file of this patent

UNITED STATES PATENTS

| | | |
|---|---|---|
| 2,236,827 | Mollet | Apr. 1, 1941 |
| 2,369,479 | Kobligk | Feb. 13, 1945 |
| 2,380,523 | Hicks et al. | July 31, 1945 |
| 2,583,781 | Lindsay | Jan. 29, 1952 |
| 2,593,883 | Hoffman | Apr. 22, 1952 |
| 2,660,470 | Nelson | Nov. 24, 1953 |
| 2,791,464 | Renno | May 7, 1957 |
| 2,807,498 | Nelson | Sept. 24, 1957 |
| 2,833,589 | Ahrens | May 6, 1958 |